United States Patent
Lindemann et al.

(10) Patent No.: US 7,552,940 B2
(45) Date of Patent: Jun. 30, 2009

(54) INTERNAL DOOR CLADDING PROVIDED WITH A HEAD AND/OR SHOULDER ANTI-SHOCK AIRBAG IN THE EVENT OF SIDE COLLISION AND/OR ROLLOVER AND A VEHICLE PROVIDED WITH SAID INTERNAL DOOR CLADDING

(75) Inventors: Sabine Lindemann, Habichtswald (DE); Eric Zimmerman, Kassel (DE); Sebastian Wandtke, Gottingen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 211 days.

(21) Appl. No.: 10/590,177

(22) PCT Filed: Mar. 14, 2005

(86) PCT No.: PCT/EP2005/002688

§ 371 (c)(1),
(2), (4) Date: Feb. 1, 2007

(87) PCT Pub. No.: WO2005/090132

PCT Pub. Date: Sep. 29, 2005

(65) Prior Publication Data

US 2007/0170705 A1  Jul. 26, 2007

(30) Foreign Application Priority Data

Mar. 26, 2004  (DE) .................. 10 2004 013 036

(51) Int. Cl.
*B60R 21/22* (2006.01)

(52) U.S. Cl. .............. 280/730.2; 280/728.2; 280/728.3; 280/730.1; 280/733

(58) Field of Classification Search ............ 280/728.2, 280/728.3, 730.1, 730.2, 733
See application file for complete search history.

(56) References Cited

U.S. PATENT DOCUMENTS

| 4,903,986 | A | * | 2/1990 | Cok et al. ............... 280/728.2 |
| 5,316,336 | A | | 5/1994 | Taguchi et al. |
| 5,979,932 | A | | 11/1999 | Jourdaine et al. |
| 6,073,959 | A | | 6/2000 | Heinz et al. |
| 6,086,091 | A | * | 7/2000 | Heinz et al. ............. 280/728.3 |
| 6,129,375 | A | * | 10/2000 | Adomeit .................. 280/730.1 |

(Continued)

FOREIGN PATENT DOCUMENTS

DE  0422360  7/1992

(Continued)

OTHER PUBLICATIONS

International Preliminary Report of PCT/EP2005/002688, issued Sep. 26, 2006.

*Primary Examiner*—John Q. Nguyen
*Assistant Examiner*—James English
(74) *Attorney, Agent, or Firm*—Matthew B. Dernier, Esq.; Gibson & Dernier LLP

(57) ABSTRACT

Internal door cladding with an airbag for head and/or shoulder side-collision protection in the event of a side collision and/or rollover, the airbag directional shoot for the airbag being provided with an outlet opening for deploying the airbag in the direction of a head and/or shoulder area and with at least one flap for closing the outlet opening.

18 Claims, 4 Drawing Sheets

U.S. PATENT DOCUMENTS

| | | |
|---|---|---|
| 6,371,514 B1 * | 4/2002 | Bombard .................. 280/730.2 |
| 6,398,254 B2 | 6/2002 | David et al. |
| 6,808,797 B1 | 10/2004 | Bordeaux |
| 6,817,626 B2 | 11/2004 | Boll et al. |
| 6,945,558 B2 | 9/2005 | Hall et al. |
| 6,991,253 B2 * | 1/2006 | Webber .................... 280/728.3 |
| 2001/0042975 A1 | 11/2001 | David et al. |
| 2003/0015860 A1 * | 1/2003 | Shah et al. ............... 280/728.3 |
| 2003/0234522 A1 * | 12/2003 | Thomas .................... 280/730.2 |
| 2004/0164525 A1 * | 8/2004 | Gray et al. ............... 280/728.3 |

FOREIGN PATENT DOCUMENTS

| | | |
|---|---|---|
| DE | 09632616 | 8/1996 |
| DE | 19653796 | 12/1996 |
| DE | 19720588 | 5/1997 |
| DE | 19725176 | 6/1997 |
| DE | 19843111 | 9/1998 |
| DE | 10032106 | 7/2000 |
| DE | 10063766 | 12/2000 |
| DE | 10104026 A1 | 1/2001 |
| DE | 10104036 | 1/2001 |
| DE | 10141943 | 8/2001 |
| DE | 19648136 A1 | 4/2003 |
| EP | 0844143 A1 | 10/2002 |
| GB | 2298169 | 2/1995 |
| WOISR | PCT/2005/002688 | 6/2005 |

* cited by examiner

INTERNAL DOOR CLADDING PROVIDED WITH A HEAD AND/OR SHOULDER ANTI-SHOCK AIRBAG IN THE EVENT OF SIDE COLLISION AND/OR ROLLOVER AND A VEHICLE PROVIDED WITH SAID INTERNAL DOOR CLADDING

BACKGROUND

The invention relates to an internal door cladding provided with head and/or shoulder anti-shock airbag in the event of side collision and/or rollover and a vehicle door provided with head and/or shoulder protection in the event of side collision and/or rollover.

The prior art knows airbags as side impact protection, especially as side head impact protection. Such side airbags are also called "windowsbag" or "curtain". Curtain-airbags are usually attached to the ceiling of the motor vehicle and unfold from above down words like a "curtain" when triggered. The disadvantage of these previously known side airbags is that they cannot be used for cabriolets.

DE 196 32 616 A1 disclosed a side impact protection for motor vehicle occupants implemented as a door construction and is continued by the present invention as the next prior art. In the door construction a chamber is build in which a housing containing an airbag is located. The chamber is closed by a lid from the passenger space which is released from its anchorage when the airbag is triggered.

When triggered, the airbag unfolds upwards in the direction of the head and shoulder of the driver respectively the passenger and by doing this it props up against the rear window.

The disadvantage of this previously known door construction is particularly the fact that the lid swings uncontrolled in the passenger space when the airbag is triggered, which represents a serious injury risk. The disadvantage is also aggravated by the fact that the lid is locked from both sides to the chamber, so that an adequate high pressure build-up of the airbag is necessary for the release of the lid from its anchorage. As a result, the lid swings with a high impact into the passenger space.

A further disadvantage of this previously known door construction is that a customary door construction cannot absorb safely the forces released by the unfolding airbag.

Therefore the danger exists that the door construction will crash stopping the airbag to unfold in due form.

DE 197 25 122 A1 discloses a protection device against the side impact in a motor vehicle. The protection device contains an airbag filled with gas placed in an encasing within the motor vehicle door which spreads over the door rail when unfold. The gas airbag is supported on the motor vehicle door at least by two inflatable props spreading over the door rail. When non-operated, the props are rolled in a roll and placed in a casing of a motor vehicle door. The disadvantage of this device is that during the triggering of the gas airbag, parts of the casing of the motor vehicle door blast away which represents a safety risk.

DE 100 32 106 A1 discloses a head support system for passenger cars without lateral roof structure. An airbag unit is disposed in the back of the seat, whose airbag covers sideways the head of the vehicle occupant when unfolded. The airbag is attached by its back margin, when regarded towards the driving direction, to the safety belt support and a guaranteeing tensile strength strip is fixed to the front lateral area of the seat and to an area of the airbag. The strip band has a length which allows it to hold the unfold airbag to a distance so that it covers the head of the vehicle occupant.

DE 100 63 766 A1 discloses an airbag device for a passenger car especially for a cabriolet. The airbag is placed in a roof frame holding the windscreen and unfolds when triggered opposite to the driving direction, so that after unfolding it is located above the head of the driver and/or the front seat passenger.

DE 198 43 111 A1 discloses a head protection for an open motor vehicle. The head protection has an airbag made of a material which shortens itself lengthwise when inflated. If not inflated the airbag is placed the area of the door rail in a front prop pointing upwards. The disadvantage is particularly the danger moment resulting from the upwards pointing prop.

DE 196 53 796 A1 discloses a device with a gas generator and an airbag for the head protection of a vehicle occupant during a side collision. The airbag has intermediary seams and incorporated rods which are disposed in such a way that during inflation the airbag can unfold fanwise around a mutual turning point of the intermediate seams and rods.

DE 197 20 588 A1 discloses a side impact device for a motor vehicle occupant which is attached to a door inner sheet/plate of a side door.

DE 42 23 620 A1 discloses an airbag device that is placed in a motor vehicle door.

A mutual disadvantage of previously known protection devices against side collision is that the mounting of the protection device against side collision is very complex, therefore time consuming and cost-intensive.

SUMMARY OF THE INVENTION

In contrast, the task of this invention is an improved internal door cladding for head and/or shoulder protection in the event of side collision and/or rollover as well as an improved motor vehicle door for head and/or shoulder protection in the event of side collision and/or rollover.

The requirements underlying this invention are met by the criteria of the independent claims. Preferred embodiments of the invention are indicated in the subclaims.

The internal door cladding has according to the invention an airbag and a directional shoot for the airbag. The directional shoot has an outlet opening for deploying the airbag in the direction of a head and/or shoulder area. When in resting state, the outlet opening of the directional shoot is closed with at least one airbag flap.

The internal door cladding according to this invention is especially advantageous because the internal door cladding contains an airbag device as integral part, consisting of an airbag, a directional shoot for the airbag and an airbag flap for closing the outlet opening of the airbag made in the internal door cladding. The internal door cladding with the airbag device can be therefore delivered assembled as an airbag module to the assembly line of a motor vehicle manufacture. This brings to a considerable reduction of the assembling effort. For instance the internal door cladding has a rebate for fitting into the fitting bead of the motor vehicle door. The internal door cladding can be pivoted downwards and fixed to the motor vehicle door for instance with a snap fit.

Preferably a gas generator is also attached to the internal door cladding, when this is delivered to the assembly line. During the mounting of the internal door cladding on the motor vehicle door it may be necessary to attach the gas generator to the internal door cladding with an additional bolted hinge or another adequate hinge for instance to the internal door support, like for instance to an internal door sheet.

Opposed to the prior art, as disclosed in DE 196 32 616 A1, in the case of the embodiment of the side collision device from this invention the airbag flap cannot swing uncontrolled into the passenger space, when the airbag is triggered.

On the contrary, after triggering the airbag as a result of the forces released by the unfolding airbag the tear line is torn open so that the airbag flap can pivot controlled or be held back by a holding strip.

According to a preferred embodiment of the invention the directional shoot is designed in a manner, that the unfolding force of the airbag is orientated on the tear line. By means of an adequate embodiment of the directional shoot the unfolding force of the airbag is thus oriented on the tear line. By means of an adequate concentration of the unfolding force of the airbag in the area of the tear line, a smaller unfolding force is altogether necessary for tearing open along the tear line. This is an advantage in more than one respect.

On one hand the airbag device can be implemented with a smaller gas generator because a smaller unfolding force is altogether necessary. On the other hand the airbag device can be dimensioned less strong, especially with regard to the directional shoot and the airbag flap, namely again based upon the smaller total unfolding force. Along with it comes a further diminishing of the injury risk by the pivoting airbag flap, because the active force with which the airbag pivots open is also reduced. Another advantage is that the airbag device can be integrated in the internal door cladding, because altogether lesser big forces are active during the unfolding of the airbag.

According to another preferred embodiment of the invention one or more collision elements are disposed in the directional shoot. The directional shoot or collision elements serve to the orientation of the unfolding airbag towards the tear line. Preferably at least one of the collision elements is wedged-shaped.

According to another preferred embodiment of the invention a collision element is placed in the area of the tear line. A force is oriented via the collision element directly towards the tear line when the airbag unfolds and hits the collision element.

According to a preferred embodiment of the invention an angular reinforcing element is placed into the directional shoot. Preferably the angular reinforcing element connects a lower limit of the directional shoot with a wall of the internal door cladding.

According to another preferred embodiment of the invention the directional shoot has a lateral limit which basically runs vertically and is fastened to the internal door cladding.

According to another preferred embodiment of the invention the tear line has a V-shaped area. By means of the V-shaped area a stress peak can be achieved at the peak of the V-shaped tearing line during the pressure build-up when the airbag is unfolding. Thus it comes to an initial tear up which continues tearing itself easily along the tearing line. That way the opening forces and with them the reacting forces on the door cladding are reduced. Another advantage is that decoration materials which tear difficultly can be applied, which increases the liberty in interior design.

According to another preferred embodiment of the invention the airbag flap is developed in a way, that when the airbag is triggered it pivots towards the window. The pivoting towards the window is an advantage because the corresponding pivoting movement is basically deviated from the passenger space, so that the injury risk is further reduced due to the pivoting airbag flap.

According to another preferred embodiment of the invention an airbag flap is placed on the door rail. For instance the airbag flap is integrated in the support of the interior door cladding.

According to another preferred embodiment of the invention the device has two airbag flaps which can pivot in opposite directions when the airbag is triggered. Thus one airbag flap pivots towards the window while the other airbag flap pivots into the passenger space. By means of the two airbag flaps a big unfolding volume is soon achieved during the unfolding of the airbag, so that the unfolding pressure necessary for the unfolding of the airbag can be reduced accordingly. Although one of the airbag flaps pivots into the passenger space this embodiment is altogether advantageous for the reduction of the injury risk when the airbag is triggered.

According to another preferred embodiment of the invention the airbag flap is connected by means of a holding strip. The holding strip offers additional safety regarding uncontrolled swing of the airbag flap into the passenger space.

According to another preferred embodiment of the invention the motor vehicle door with the device according to the invention are designed as a so called hybrid door. Hybrid doors and their manufacturing are known from prior art.

A hinge made of parts of synthetic material and metal parts with a form closure between both components made by means of injection moulding or extrusion allows the manufacturing of resistant, cost-efficient units.

BRIEF DESCRIPTION OF THE DRAWINGS

Furthermore preferred embodiments of the invention will be explained with reference to the drawings. They show.

DETAILED DESCRIPTION OF THE INVENTION

Figure 1:
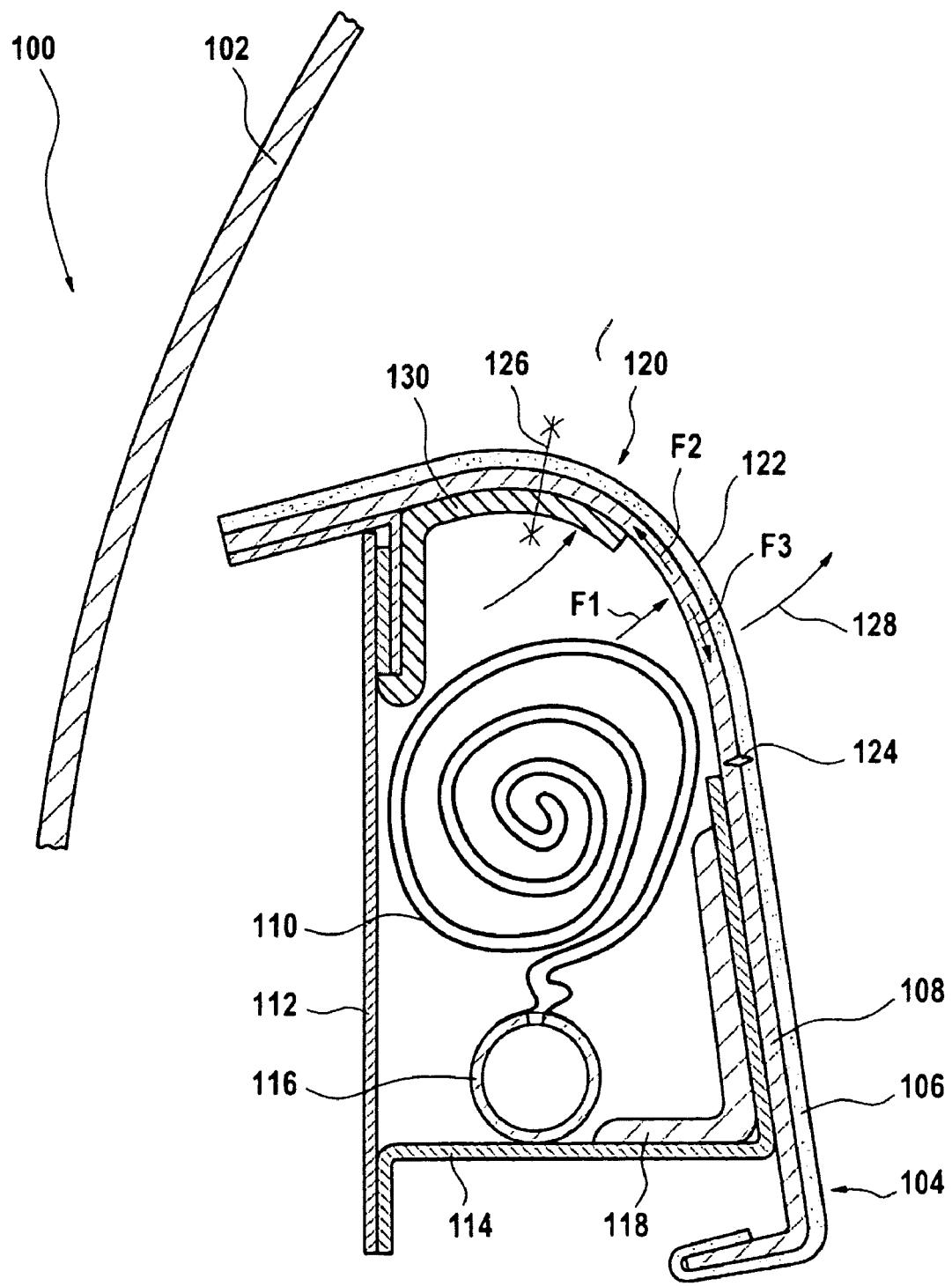
FIG. 1: a sectional view of a first embodiment of a device according to the invention.

FIG. 1 shows the upper area of a motor vehicle side door 100, for instance the driver door. The motor vehicle door 100 has a window 102 and an internal door cladding 104. The internal door cladding 104 has an exterior decorative layer 106, for instance made of a PVC foil. The decorative layer 106 is mounted on a support 108 of the internal door cladding 104.

Inside the internal door cladding 104 there is a directional shoot for an airbag 110. The directional shoot has basically a vertical limit 112 and basically a horizontal limit 114. By means of the limits 112, 114 and the outline of the support 108 a receptacle for the airbag 110 is formed in the directional shoot. In FIG. 1 the airbag 110 is shown in closed state.

Next to the limits 112 and 114 side limits of the directional shoot made this way are not necessary, especially not then, when the airbag 110 unfolds basically in the pointed direction 128. This can be achieved for instance by an adequate sewing of the airbag 110.

The airbag 110 is connected to a lance 116. The lance 116 is connected to a generator not shown in FIG. 1, which is also fastened to the door. When the airbag is triggered gas flows from the gas generator through the lance 116 into the airbag 110 in order to unfold it.

For the absorption of the forces acting in unfolding of the airbag 110 an angular reinforcing element 118 is placed on the limit 114.

An airbag flap 122 is placed in the area of the door rail 120 of the internal door cladding 104. Preferably the airbag flap 122 is integral part of the support 108. The airbag flap is limited by the tearing line 124, which runs along the support 108 and/or the decoration layer 106. The tearing line 124 can be for instance an attenuation line, particularly an attenuation rill which was cut mechanically or with an ultra sound knife or a laser beam into the decoration layer 106 and/or the support 108.

On the upper end of the airbag flap 122 a hinge 126 is located, so that the airbag flap 122 can pivot open in the pointed direction 128. The hinge 126 can be made of a layer of rubber 130 or a layer of EPDM or reinforced by one. In the embodiment example presented here the rubber layer 130 is placed in the area of the door rail 120 below the support 108 of the internal door cladding 104.

Figure 4:
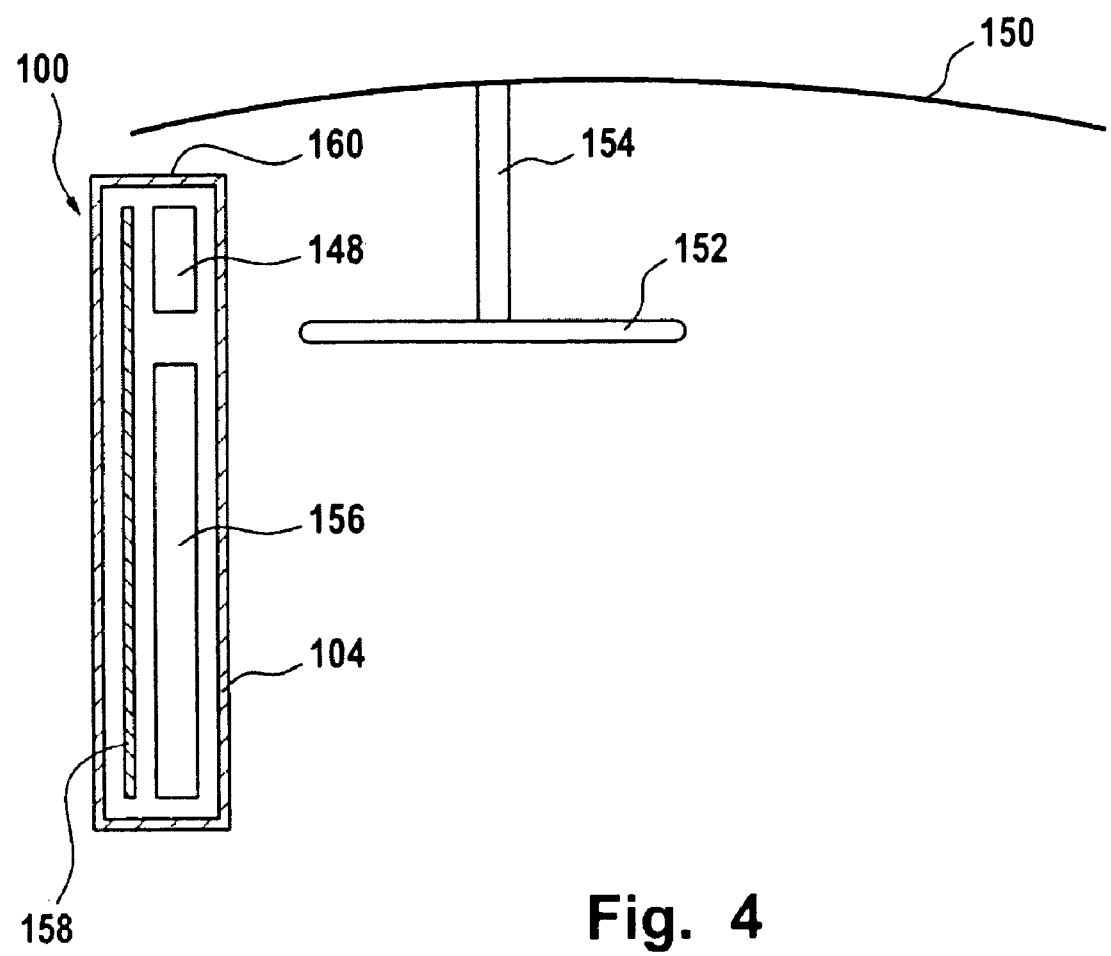
FIG. 4: shows a schematic top view of the interior of a motor vehicle.

The limits 112 and 114 can be of synthetic material of metal and are fixed to the support 108, so that the airbag 110 forms together with the lance 116 and the directional shoot made by the limits 112 and 114 an integral part of the internal door cladding 104. Additionally the gas generator can be fixed to the internal door cladding 104 as shown in FIG. 4.

The internal door cladding 104 with its airbag device which constitutes an integral part of the internal door cladding 104 can be thus delivered as a ready assembled module to the assembly line in order to be mounted on a motor vehicle door. For the final assembly of the gas generator it may be necessary to fix it additionally for instance by means of a bolted connection to an internal door support, such as an internal door sheet.

When triggered, the airbag 110 unfolds within the directional shoot made by the limits 112, 114 and the support 108 and hits the airbag flap 122. As a result of the forces acting upon the airbag flap 122, that is the force F1 and its components F2 and F3, the tear line 124 is torn open and the airbag flap 122 pivots in the pointed direction 128 around the hinge 126 towards the interior of the window 102. Thus the outlet opening of the directional shoot is opened so that the airbag 110 can unfold in a head area of the passenger space. Thus the head and/or shoulder of the driver respectively of the passenger are protected. The limits 112 and 114 act as bearings for the absorption of the force F1 respectively its components.

Figure 2:
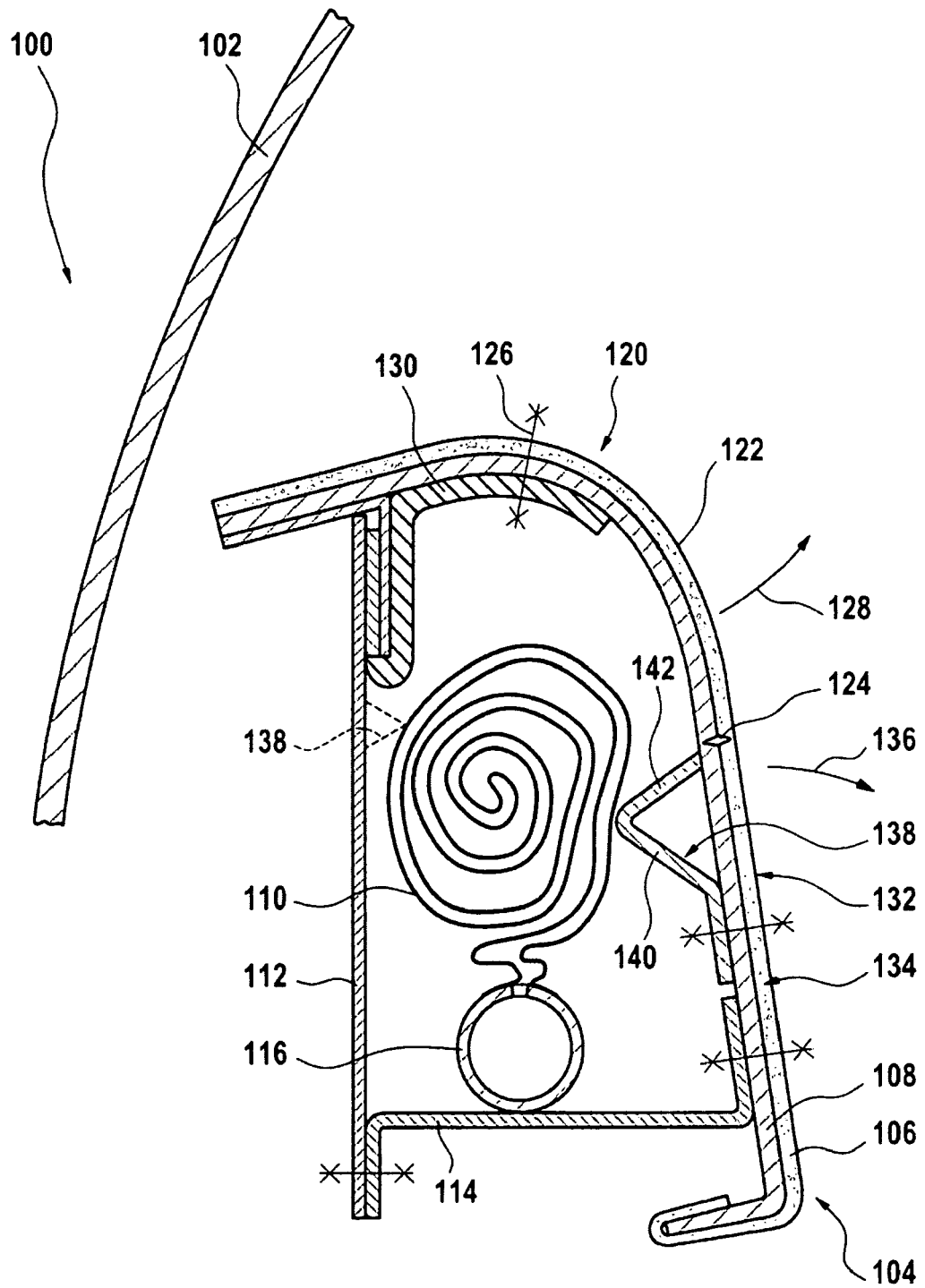
FIG. 2: a sectional view of a second embodiment of a device according to the invention.

FIG. 2 shows an alternative embodiment of the motor vehicle door 100. The elements in FIG. 2 which correspond to elements in the FIG. 1 are marked with the same reference symbols.

In the embodiment in FIG. 2 the motor vehicle door 100 has another airbag flap 132. The airbag flap 132 is limited on one hand by the tear line 124 and on the other hand by another articulation or hinge 134. Preferably the airbag flap 132 is integral part of the support 108 of the internal door cladding 104 like the airbag flap 122. Based on the disposal of the hinge 134 below the tear line 124 the airbag flap 132 pivots open in the pointed direction 136, which is opposed to the pointed direction 128 when the airbag 110 is triggered. Unlike the airbag flap 122 the airbag flap 132 doesn't pivot towards the window 102 but into the passenger space.

A collision element 138 is disposed below the airbag flap 132. In the embodiment example presented here the collision element 138 is wedge-shaped. The collision element 138 has a first angle leg 140, which constitutes an impact surface for the unfolding airbag 110. Another angle leg 142 of the collision element 138 stands on the tear line 124.

When the airbag 110 is triggered it collides against the angle leg 140. The force exercised hereby is transferred via the angle leg 142 at least partially to the tear line 124, so that this tears open respectively through this the tear process is facilitated.

Alternatively one or more collision elements 138 can for instance be disposed on the limit 112, as shown in FIG. 2 with interrupted lines, in order to guide the unfolding airbag towards the tear line 124. Hereby or by means of further collision elements 138 the unfolding airbag is guided towards the tear line. Through the resulting concentration of the unfolding force of the airbag 110 on the tear line 124 a relative low unfolding pressure is necessary, which is also an advantage for the diminishing of the injury risk as well as for the dimensioning of the device, particularly of the support 108 as well as the limits 112, 114.

A relative low unfolding pressure is also made possible through the fact that due to both airbag flaps 122 and 132 a relative big outlet opening is created, through which the airbag can unfold easily.

Figure 3:
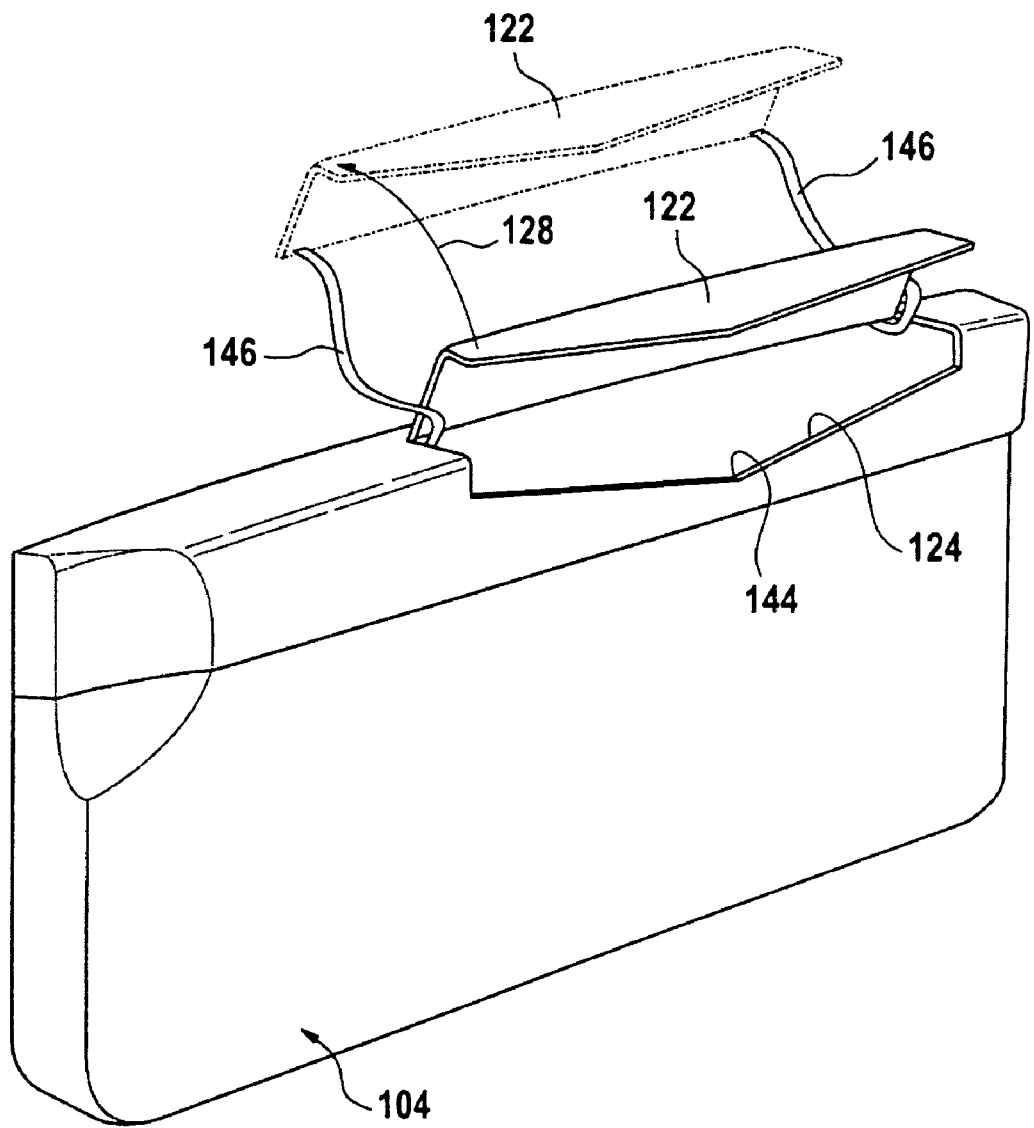
FIG. 3: a view in perspective of an embodiment of a door cladding according to the invention.

The FIG. 3 shows a view in perspective of an embodiment of a door cladding 104 according to the invention. Elements of FIG. 3 which correspond to the FIGS. 1 and 2 are marked with the same reference symbols.

In the embodiment from FIG. 3 the tear line 124 has a V-shaped course. When the airbag 110 unfolds during the pressure build-up a stress peak is reached at the peak 144 of the V-shaped tear line 124. This brings to an initial tear which continues tearing itself easily along the tearing line. Based on this procedure the unfolding pressure of the airbag 110 can be reduced accordingly.

FIG. 3 shows the airbag flap 122 in opened position that is with cleared outlet opening of the directional shoot.

Furthermore FIG. 3 shows as embodiment variant that the airbag flap 122 can be held with holding strips 146 instead of the hinge 126. The holding strips 146 are fastened to an adequate place in the interior of the internal door cladding 104. When the airbag 110 is unfolding (compare to FIGS. 1 and 2) the holding strips 146 insure that the airbag flap 122 doesn't swing uncontrolled into the passenger space.

FIG. 4 shows a schematic top view of the interior of a motor vehicle. The interior is limited among other things by the internal door cladding 104 of the motor vehicle door 100 and an instrument panel 150. A steering wheel 152 of the motor vehicle is placed on a steering column 154 of the motor vehicle.

Behind the exterior of the internal door cladding 104 its airbag device 156 is placed which has an airbag stretched lengthwise, a directional shoot and an airbag flap as well as other elements like for instance collision elements or reinforcement elements (compare to for instance the airbag 110, the limits 112, 114 and the airbag flap 122 as well as the collision element 138 of the FIGS. 1, 2, and 3).

Within the door 100 a support 158 can be placed for the incorporation of different door aggregates such as window regulator and suchlike. The support can be an internal door sheet. The gas generator 148 can be fixed additionally to the internal door cladding 104 for instance by means of a bolted connection to the support 158.

In the embodiment presented here the gas generator 148 is placed on a side of the door 160 opposite to the instrument panel 150. The gas generator 148 is approximately in the area of the steering column and/or the steering wheel 152. The steering wheel 152 has preferably a steering wheel airbag, so that for this area the unfolding of the airbag device 156 is not necessary.

The device according to the invention is preferably applied to open-top convertible cars which don't have a roof structure for the usual curtain-airbags. The present invention enables the integration of an airbag for the side-collision protection, especially for head-side-collision protection into the door cladding of such a motor vehicle in an advantageous constructive way.

When manufacturing the device according to the invention the airbag module can be delivered to the assembly line mounted into the door rail as well as it can be mounted first to the internal door sheet before the assembly of the door cladding.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An internal door cladding, comprising:
   a door rail having at least one airbag flap, the airbag flap having a first plane and a second plane wherein the first plane and the second plane are not coplanar;
   an airbag for head and/or shoulder side-collision protection in the event of a side collision and/or rollover located on the door rail of the internal door cladding;
   an airbag directional shoot including an outlet opening for deploying the airbag in a direction of a head and/or shoulder area;
   said airbag flap for closing the outlet opening; and
   a tear line in the decorative layer proximate to the airbag directional shoot that traverses a substantially "V"-shaped course along both the first plane and the second plane and includes a sharp inflection point or peak such that upon an unfolding force of the airbag against the airbag flap, a tear is initiated at the inflection point or peak and propagates along the tear line.

2. The internal door cladding according to claim 1, further comprising a collision element located in the airbag directional shoot for initiation of a part of the unfolding force of the airbag on the tear line or for guiding the unfolding airbag towards the tear line.

3. The internal door cladding according to claim 2 wherein the collision element is wedged-shaped.

4. The internal door cladding according to claim 2, wherein the collision element has an angle leg which stands up in the area of the tear line.

5. The internal door cladding according to claim 1, further comprising an angle shaped reinforcement element coupled to the airbag directional shoot.

6. The internal door cladding according to claim 1, wherein the airbag directional shoot has a side limit which runs vertically.

7. The internal door cladding according to claim 1, further comprising a gas generator for deploying the airbag.

8. The internal door cladding according to claim 7, wherein the gas generator is placed in an incorporation position on an opposite side of an instrument panel.

9. The internal door cladding according to claim 1, wherein the airbag flap is designed to swing open towards a side window.

10. The internal door cladding according to claim 1, wherein the airbag flap is placed on a support of the internal door cladding.

11. The internal door cladding according to claim 1, further comprising a further airbag flap for covering the outlet opening, wherein the further airbag flap is designed for pivoting in an opposite direction from the at least one airbag flap.

12. The internal door cladding according to claim 1, further comprising a holding strip for the airbag flap.

13. The internal door cladding according to claim 1, wherein the airbag flap is designed to pivot.

14. The internal door cladding according to claim 6, wherein the limits for the directional shoot are fixed to a support of the internal door cladding, and a housing for the airbag in folded state is formed below a rail of the internal door cladding by means of the limits and the support.

15. The internal door cladding according to claim 14, wherein the housing includes a lance for connection of the airbag to a gas generator.

16. A motor vehicle door, comprising:
    an internal door cladding, the internal door cladding having a door rail;
    at least one airbag flap located on the door rail, the airbag flap having a first plane and a second plane wherein the first plane and the second plane are not coplanar;
    a head and/or shoulder antishock airbag in the event of side collision and/or rollover coupled to the internal door cladding, and including a directional shoot for the airbag, the airbag directional shoot located on the door rail of the internal door cladding having an outlet opening for deploying the airbag towards a head area;
    said airbag flap for covering the outlet opening; and
    a tear line proximate to the airbag directional shoot that traverses a substantially "V"-shaped course along both the first plane and the second plane and includes a sharp inflection point or peak such that, upon an unfolding force of the airbag against the airbag flap, a tear is initiated at the inflection point or peak and propagates along the tear line.

17. The motor vehicle door according to claim 16, wherein the door is a hybrid door.

18. The motor vehicle door according to claim 16, wherein the door is sized and shaped for a cabriolet.

* * * * *